United States Patent
Bech et al.

(10) Patent No.: US 8,328,709 B2
(45) Date of Patent: Dec. 11, 2012

(54) FLUID SEPARATOR APPARATUS COMPRISING A SPIN-UP ASSEMBLY

(75) Inventors: Knut Halvard Bech, Trondheim (NO); Karl Venås, Haslum (NO); Stein Tore Johansen, Ranheim (NO)

(73) Assignee: Sinvent AS, Trondheim (NO)

( * ) Notice: Subject to any disclaimer, the term of this patent is extended or adjusted under 35 U.S.C. 154(b) by 903 days.

(21) Appl. No.: 11/988,519

(22) PCT Filed: Jul. 10, 2006

(86) PCT No.: PCT/NO2006/000266
§ 371 (c)(1), (2), (4) Date: Nov. 6, 2008

(87) PCT Pub. No.: WO2007/011233
PCT Pub. Date: Jan. 25, 2007

(65) Prior Publication Data
US 2009/0131236 A1 May 21, 2009

(30) Foreign Application Priority Data
Jul. 11, 2005 (NO) .................................... 20053362

(51) Int. Cl.
*B04B 11/00* (2006.01)
(52) U.S. Cl. ............ 494/49; 494/64; 494/66; 210/380.3
(58) Field of Classification Search .................. 494/7–9, 494/42–43, 50–54, 56, 66, 5, 49, 64; 210/360.1, 210/380.1, 380.3
See application file for complete search history.

(56) References Cited

U.S. PATENT DOCUMENTS

| | | | | |
|---|---|---|---|---|
| 1,906,457 A * | 5/1933 | Flowers | ......................... | 494/66 |
| 3,187,997 A * | 6/1965 | Gooch | ........................... | 494/53 |
| 4,303,192 A * | 12/1981 | Katsume | ........................... | 494/9 |
| 4,334,647 A * | 6/1982 | Taylor | ............................. | 494/37 |
| 4,421,502 A * | 12/1983 | Jakobs | ............................. | 494/7 |
| 4,702,837 A | 10/1987 | Lecoffre et al. | | |
| 5,062,955 A | 11/1991 | Sciamanna | | |
| 2009/0131236 A1 * | 5/2009 | Bech et al. | ........................ | 494/5 |

FOREIGN PATENT DOCUMENTS

DE   3723864 A1 *   1/1989
WO   99/43439   9/1999

* cited by examiner

Primary Examiner — Charles E Cooley
(74) Attorney, Agent, or Firm — Ladas & Parry LLP

(57) ABSTRACT

An apparatus for separating a fluid flow, the fluid flow comprising lighter and heavier fractions to be separated from each other, comprises a rotary centrifuge device (1), the lighter fractions being carried further on and the heavier fractions being carried through an outlet (5). The invention is characterized in that a spin-up assembly (17) is arranged upstream of the rotary centrifuge device (1), the spin-up assembly (17) being configured in such a manner that the fluid flow entering the rotating cylinder (1) is imparted a rotational movement, the rotational velocity of the cylinder (1) being adjustable so that the relative velocity difference between the rotating movement of the fluid flow and the rotational velocity of the centrifuge device (1) is optimal in terms of separation.

20 Claims, 8 Drawing Sheets

FLUID SEPARATOR APPARATUS COMPRISING A SPIN-UP ASSEMBLY

BACKGROUND OF THE INVENTION

1 Field of the Invention

The present invention relates to an apparatus for separating a fluid flow, more particularly an apparatus for extracting one or more heavier fractions from a fluid mixture being carried through a pipeline.

2 Technical Background of the Invention

In the production of oil, for example, it is very important that water is separated from the oil in an efficient manner. By separating water from the oil in the area of a well, the water may be re-injected or processed in the near well area. In this manner, the need for energy for transporting the oil to the platform, floats, or land-based installations is reduced. In addition, problems associated with emulsions and precipitations in the transport pipeline are reduced.

The government has made demands regarding the amount of oil contained in water discharged from permanent installations, the maximum allowed value today being 40 mg H-C/l water (H—C=Hydrocarbons). The maximum allowed values for floating installations are the same as for ships, i.e. approx. 100 mg H-C/l water. In other applications there is a need for separating water and/or oil from gas. In the production of gas, it is important to dehydrate the gas in order to avoid that droplets cause damage to compressors used for pressurizing the gas for transport through pipelines. At high pressures the gas dehydration process is complicated in that 1) there is only a small density difference between the liquid and gas, and 2) the interface tension between the liquid and gas is small. It is therefore critical that the fluid shear stress of the separated liquid flow is minimized. The present invention is suitable for all the above applications.

Today, various methods exist for the processing of water containing oil or wet gas, which methods may be broadly subdivided into the following groups:
separation by means of gravity,
separation by filtering,
separation by floatation, and
separation by acceleration.
The present invention belongs to the latter group.

WO 01/002967 A1 relates to a device for separating a fluid flow comprising a lighter and a heavier fraction, wherein the fluid flows through a pipeline and is made to rotate by a rotary element in the fluid path. The device operates according to the cyclone principle as the rotary motion of the fluid forces the heavier fluid fractions outwards whereas the lighter fractions remain close to the center of the pipe bore. At the center of the pipe bore a perforated pipe body is arranged through which the lighter fractions are guided.

U.S. Pat. No. 5,062,955 relates to a hydrocyclone separating high and low density fluids. The cyclone is driven by a motor and the incoming fluid is separated into three fractions, namely water, diluted oil and concentrated oil.

Another approach that may be used for acceleration separation is the centrifuge principle. The operating principle of a centrifuge is considered well known and needs no further explanation. Generally, this principle will be suited only for mixtures of liquids or mixtures of liquid and solids, perhaps liquids containing dispersed gases.

One of the drawbacks of the above prior art technologies is that the separation effect is not as good as could be desired. One of the reasons for this is that the relative difference in rotational velocity between the fluids within the pipe bore and the inner surface of the pipe bore results in fluid shear stresses causing the more or less continuous film of the heavier fluids accumulated on the inner surface of the pipe bore to be dragged loose and carried along with the fluid at the pipe bore center (entrainment). This phenomenon deteriorates the separation effect.

SUMMARY OF THE INVENTION

According to the present invention, a device is provided which is more efficient than the existing solutions, which is operationally reliable, robust, and requires little maintenance, and which may be used for the separation of a wide range of fluid types. It is further an object of the present invention to provide a device that does not suffer from the above drawbacks. According to the present invention, these objects are achieved by a device wherein a spin-up assembly is arranged upstream of a centrifuge device, the spin-up assembly being configured in such a manner that the fluid flow entering the centrifuge device is imparted a rotational movement, the rotational velocity of the centrifuge device being adjustable to allow adjustment of the relative velocity difference between the rotating movement of the fluid flow and the rotational velocity of the centrifuge device and wherein the spin-up- and/or cylinder assembly is located in a replaceable bore that is replaceable with at least one other bore containing an open pipe without any constrictions or blocking elements, whereby the separator may be pigged. Additional advantageous features and embodiments include:
the centrifuge device has a number of holes through which the heavier fraction is admitted;
the spin-up assembly does not rotate and that the centrifuge device is made to rotate by means of a suitable drive;
the spin-up assembly is designed in such a manner that it effects the rotating movement of the centrifuge device, for example such that the relative difference in rotational velocity between the spin-up assembly and the centrifuge device is adjustable;
a spin-down assembly is positioned downstream of the centrifuge device;
a spin-up assembly and the at least one other bore containing an open pipe without any constrictions or blocking elements to allow passage of a pig therethrough are installed in a revolver magazine comprising a number of bores;
at least the spin up assembly and the at least one other bore containing an open pipe without any constrictions or blocking elements to allow the passage of a pig therethrough are installed in a hydraulic or other type of piston that allows the separation apparatus to be replaced by an open bore;
several separation assemblies of the above kind are arranged in series one after the other or in parallel; and
the spin-up assembly is located in the replaceable bore, and the centrifuge device is fixed and is of a substantially cylindrical type whereby the separator may be pigged.

BRIEF DESCRIPTION OF THE DRAWINGS

In the following, a detailed description of preferred embodiments of the present invention is given with reference to the attached drawings, in which.

DESCRIPTION OF THE PREFERRED EMBODIMENTS

Figure 1:
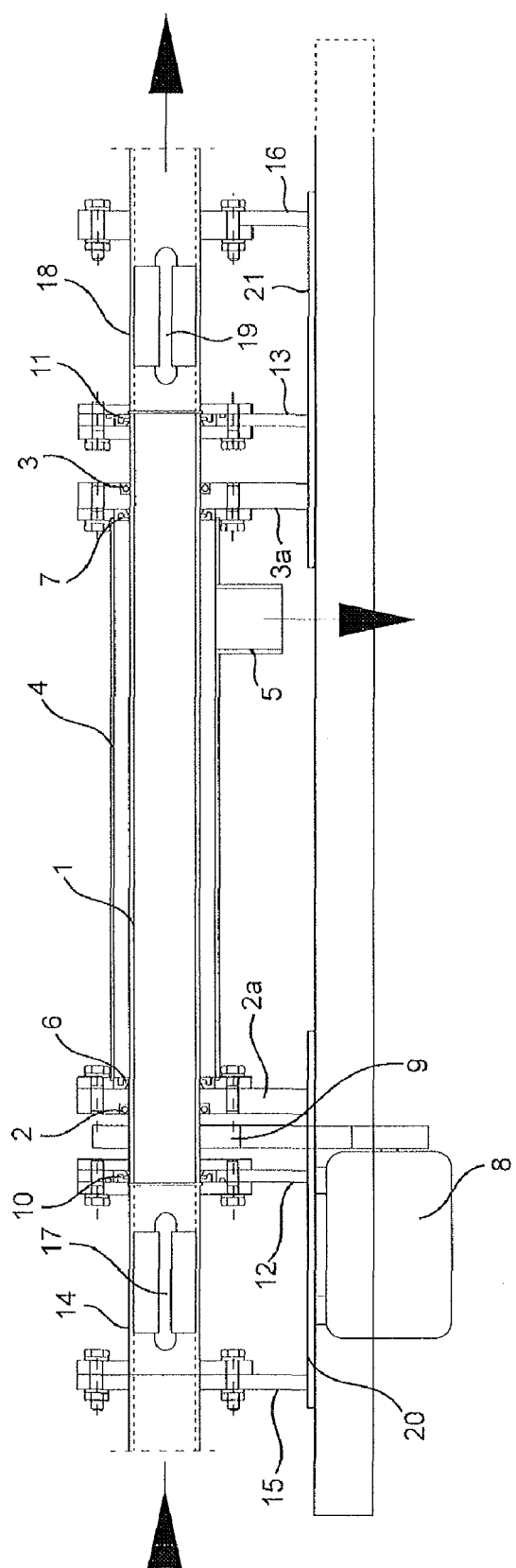
FIG. 1 shows a longitudinal view of one embodiment of the present invention.

It is understood that centrifuge device 1 may have any suitable shape and is not limited to a cylindrical shape. Moreover, the centrifuge assembly also does not need to be provided with holes. For example, it is known to use conical centrifuge devices not comprising holes, and such an embodiment would in principle work equally well as the embodiments described in more detail in this description and shown in the figures.

The spin-up assembly, according to a preferred embodiment, is shaped in such a manner that the angle of the shovel blades to the axial direction starts at zero degrees and ends in an angle that may be between 30 and 60 degrees, with a typical value being 40 degrees. The angular coordinate of a shovel increases with the axial coordinate. A typical relation is that the angular coordinate, θ, increases as the square of the axial coordinate, z, which may be expressed as $$r\theta = z^2/A,$$

where r is the radial coordinate and A is a constant having dimension meter per radian. The shovel blades should provided be in a number ensuring an as uniform rotation of the fluid mixture as possible, yet without obstructing the flow in an unacceptable manner. The shovels should be relatively thin and have entry and exit profiles adapted to minimize the generation of turbulence.

It is understood that the invention is not limited to a spin-up assembly of the above kind. Other embodiments and devices that will help bringing a fluid flow to rotation could be equally suitable.

An important aspect of the present invention is the transition from the spin-up assembly 17 to the centrifuge device 1. The fluid that is fed through the pipeline and that is to be subjected to a separation process is brought to rotate in the spin-up assembly 17. The spin-up assembly 17, according to one embodiment, includes a number of blades that are shaped in such a manner that a part of the axial movement of the fluid is converted to a rotational movement, hence functioning like a cyclone. The centrifuge device 1 rotates with a rotational speed that substantially corresponds to the fluid rotation. This will minimize the velocity difference between the rotating fluid and the rotating cylinder 1, and hence the fluid shear stresses in the boundary layer between the rotating fluid and the rotating cylinder 1 are reduced to a minimum. A stable and calm boundary layer between the rotating fluid and the rotating cylinder 1 ensures that the heavier fluid fractions that accumulate at the inner surface of the rotating cylinder 1 are not pulled back into the fluid, but rather are allowed, in a controlled manner, to flow through the openings provided in the cylinder 1 to be collected at an appropriate location. This combination of a cyclone and centrifuge separator achieves a combined effect that by far exceeds the separation effect of a cyclone or centrifuge separator, for example.

The spin-down assembly 19 does not act to improve the separation effect, but may be desirable in many cases in order to optimize the downstream fluid flow through the pipeline. In this case, the purpose of the spin-down assembly 19 is to convert the rotational movement of the remaining fluid back to an axial movement so that the pressure and velocity profile of the fluid is optimal. In some cases, the spin-down assembly 19 may advantageously be omitted.

Figure 2:
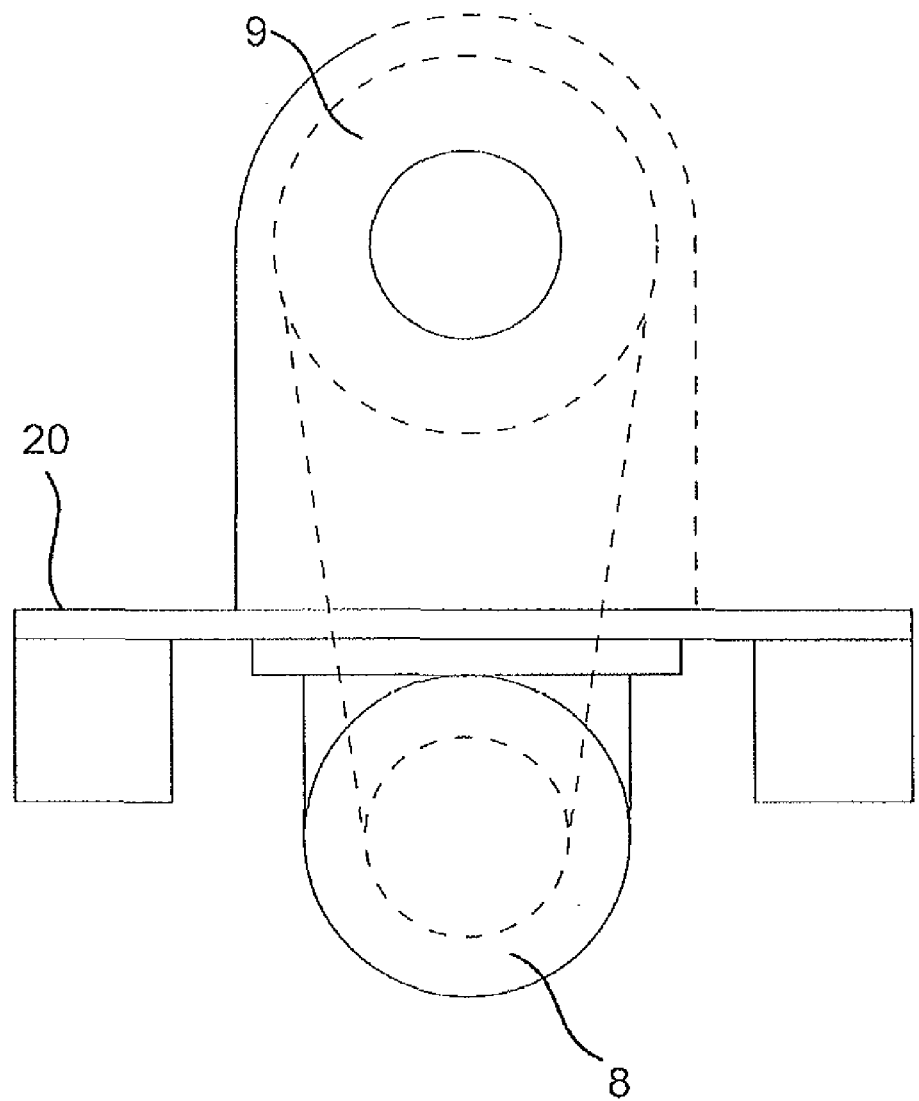
FIG. 2 shows a cross-section view thereof
Figure 3:
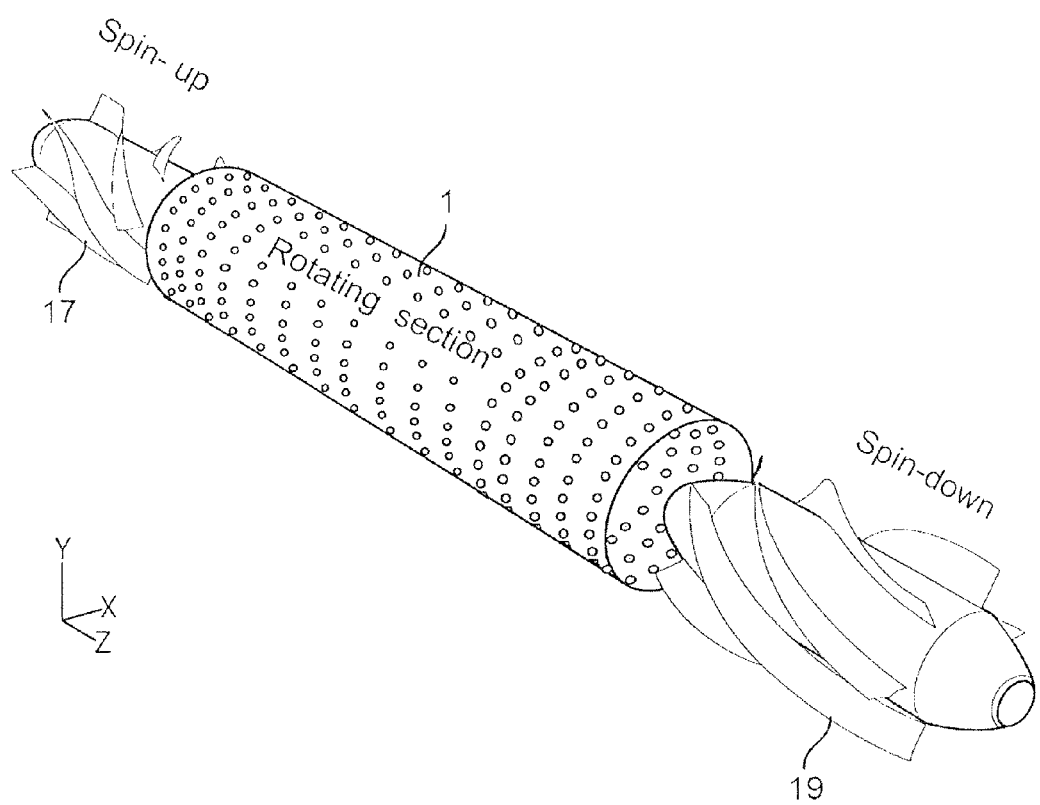
FIG. 3 shows a principle drawing, in perspective, of the embodiment shown in FIG. 1 and FIG. 2.

In the above embodiment, the spin-up assembly 17 is stationary, while a motor 8 rotates the cylinder 1 (see FIG. 2). It is understood that the choice of motor depends on the circumstances, and that any suitable drive may be used. The same applies to the type of power transmission, whether it is belt or chain transmission, gears, or the like. Thus, the rotational velocity should be fine-tuned based on the prevailing process parameters, such as pressure, fluid velocity, fluid composition and fluid properties.

According to another embodiment of the present invention, the use of an external drive unit may be dispensed with. In this embodiment, the spin-up assembly 17 may be fixedly mounted to the centrifuge device 1, so that the spin-up assembly 17, in addition to impart a rotational movement on the fluid flowing through the pipeline, also contributes to rotate the centrifuge device 1. In this case, the wings of the spin-up assembly 17 must be shaped in such a manner that the rotational velocity imparted to the fluid by the spin-up assembly 17 and the rotational velocity imparted to the cylinder 1 by the spin-up assembly are coordinated in such a manner that the above advantages with respect to the avoidance of fluid shear stresses is maintained. According to one embodiment, a fixed or controllable transmission may be provided between the spin-up assembly 17 and the centrifuge device 1, so that the relative velocity between the rotating fluid and the rotary centrifuge device 1 is optimized, which in most cases would imply that the relative velocity difference is as small as possible. The advantage of the above design is that the use of a drive means is avoided, which may be important as such a separation process might take place on the sea floor in connection with oil or gas production, and all measures that may contribute to reduce the number of maintenance points will be considered advantageous. A possible drawback of such an embodiment might be that the fluid carried through the pipeline looses pressure and velocity.

Figure 4:
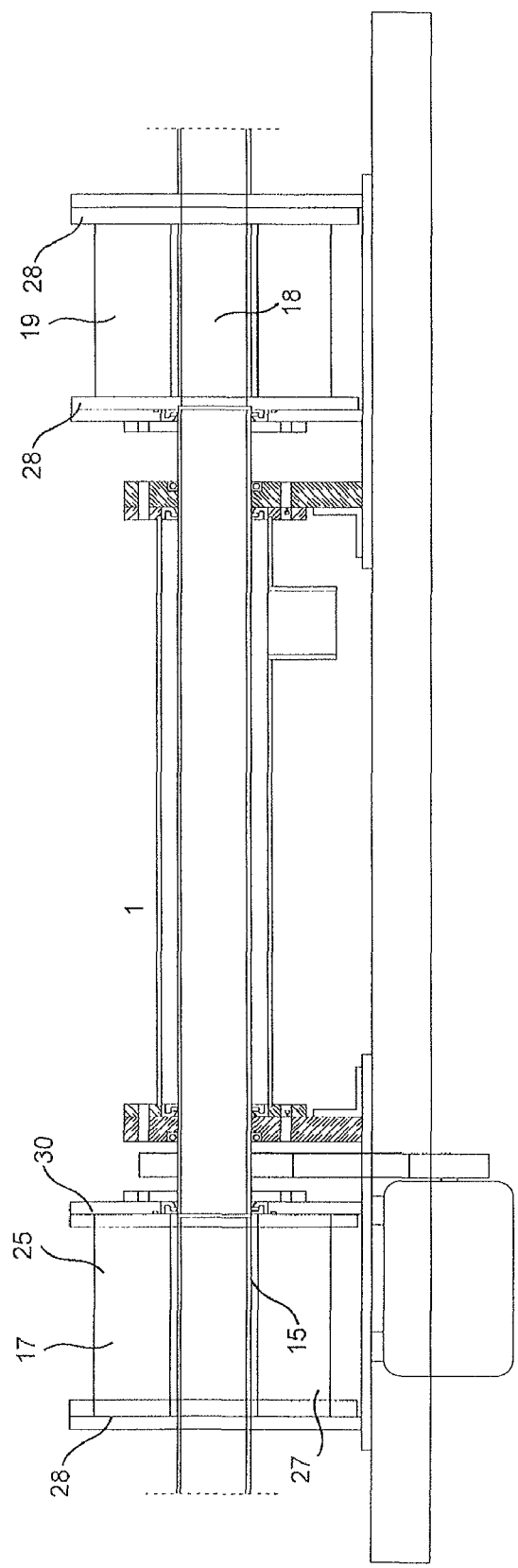
FIGS. 4-6 show an embodiment of the invention including a revolver magazine.
Figure 5:
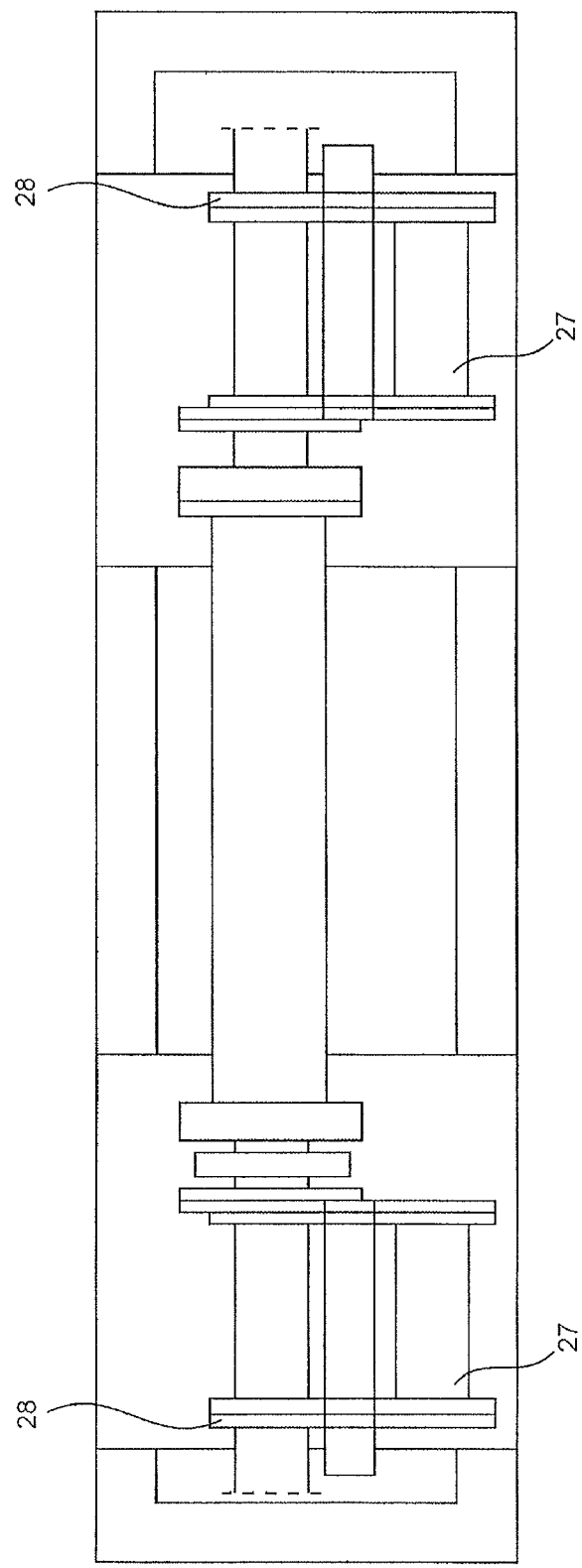
Figure 6:
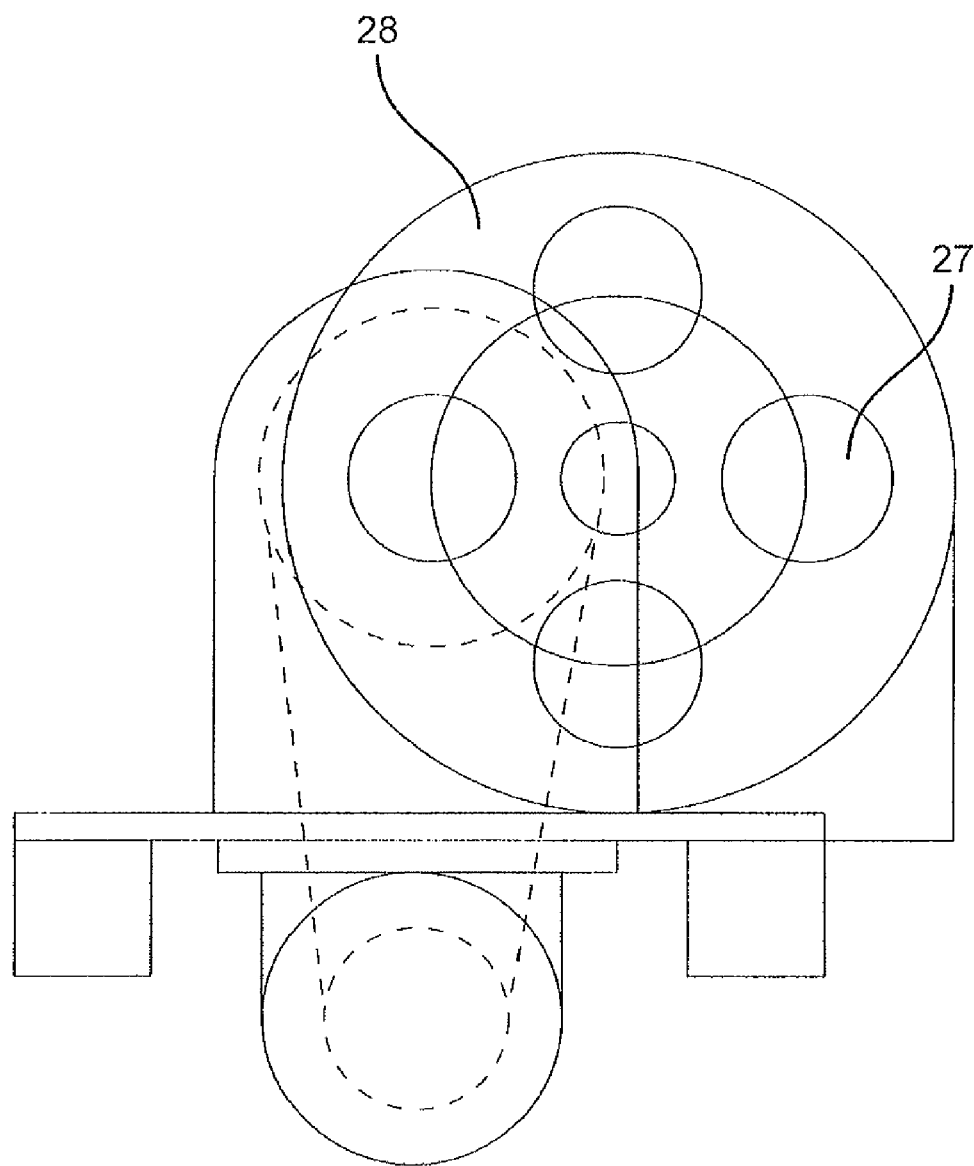
Figure 7:
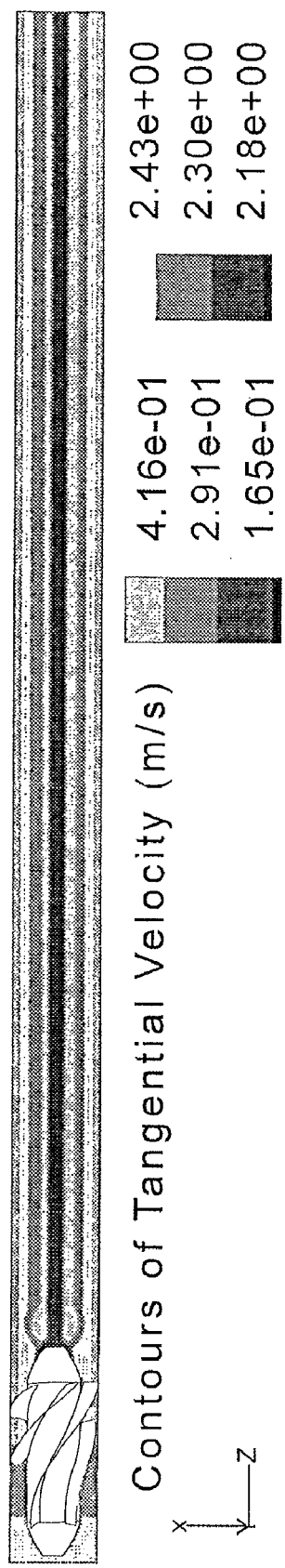
FIG. 7 shows the graphical results of a CFD analysis conducted in conjunction with an embodiment of the present invention, and FIG. 8 show an alternative embodiment of the revolver magazine shown in FIG. 4-6.
Figure 8:
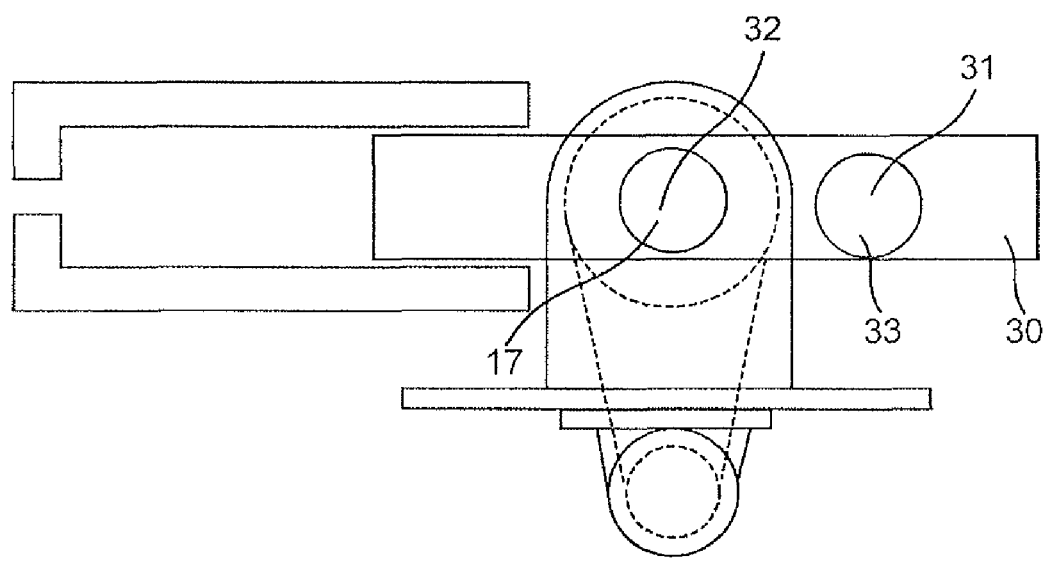

Another aspect of the present invention is an arrangement that allows a pig to be run through the pipeline or that allows the spin-up assembly and/or cylinder to be replaced. According to the present invention, this may be achieved, for example, by arranging a "revolver magazine" in conjunction with the separator device and the pipeline. One example of such a revolver magazine is shown in FIG. 4-6, this arrangement being adapted to an embodiment wherein the spin-up assembly 17 and possibly the spin-down assembly 19, if provided, are stationary and the centrifuge means 1 is being rotated by a drive. In this case, the revolver magazine 28 could comprise one or more different spin-up assemblies 17 (possibly having a similar magazine for corresponding spin-down assemblies 19) adapted for different fluid types, fluid compositions, and/or processing conditions, as well as an open bore allowing the passage of a pig. With this embodiment, it could be of major importance that the centrifuge device 1 is also pigged by the pig as the inside of the centrifuge device 1 and not least the openings or holes in the centrifuge device 1 may be covered by layers of deposits that may have a very adverse influence on the separation effect. In the case where the spin-up assembly 17 and the cylinder 1 form one rotary assembly the revolver magazine 28 could be arranged in such a manner that one of the bores 27 allows the pig to pass unobstructed for pigging the pipeline and/or access to downstream equipment, while one or more bores 27 are provided with the same or different types of spin-up/centrifuge assemblies. As, in the embodiment wherein the spin-up assembly 17 and the centrifuge device 1 form one rotating assembly, the pig may not reach the inner surface of the cylinder 1, advantageously equal assemblies could be installed in several of the bores, so that a clogged separation assembly according to the present invention may be replaced with a clean separation assembly without having to initiate extensive actions or interventions.

The revolver magazine 28 may be replaced by a simpler assembly, see *fig.* 8, constructed as a hydraulic valve or piston 30, for which two or more alternative bores 31, 32 are available for use. One of the bores contains the spin-up assembly 17, and the other bore contains an open pipe 33 without any constrictions or blocking elements. By replacing the spin-up assembly 17 with an open pipe 33 for a shorter or longer time period the separator may be pigged, especially if the centrifuge is of a substantially cylindrical type.

In the following, an exemplary embodiment of the invention is described. The example is based on a so-called CFD analysis that has been conducted considering a case in which a fluid flow to be processed is comprised of oil and water. According to the calculations, the spin-up assembly 17 has a substantial impact, and the ratio between tangential velocity and axial velocity, W/U,=1.3. The flow still has some rotary impulse when exiting the assembly. The rotary impulse flux is reduced by 74% in the spin-down assembly.

Rotary Assembly
Separation Efficiency:

$$\eta = 1 - \exp[-0.06*(1+1.69R^4/a^4)^{1/2} \Delta \rho d^2 LQ/(\mu R^4)]$$

The separation efficiency increases with the length L, flow rate Q, drop diameter d, and density difference $\Delta\rho$. The efficiency decreases with R to the power of four, which may be important on upscaling. Other symbols are a (the radius of the central body of the spin-up assembly 17), and $\mu$ (the viscosity of the continuous liquid).

The assembly yields a substantially improved separation as compared with a gravity separator, as the driving force would be at least 5 g.

Length:

In this example, the centrifuge device 1 has the shaped of a pipe or cylinder and should have a length of at least 0.3 m for the chosen cylinder diameter. Even though the separation efficiency will increase with the length, several factors limit the cylinder length. A simulation carried out using oil and water phase (Eulerian two-phase model, RSM turbulence model, Fluent 6.2.5) indicates that the (axially) stationary core will be less distinct for a larger cylinder length (approx. 1 m in this example). Moreover, a too long section will increase the risk that the lighter phase (oil) will be extracted together with the heavier phase (water). From a mechanical perspective, there will be length limitations in relation to supporting arrangement and pipe strength. Thus, for this particular example a pipe length of 0.7-0.9 m is assumed advantageous.

Drain Hole:

The openings are to drain an amount of liquid corresponding to a water cut (WC) anywhere in the area from 5 to 50%. The area of the hole is assumed to be constant, so that the water flow rate must be regulated using the pressure in the collecting chamber 4.

The pressure drop within the device is assumed to be approx. 2000 Pa (calculated for a single phase flow of oil). There will be only a small pressure difference between the inner centrifuge device 1 and an outer annulus 4 as the liquid outside the centrifuge device 1 has approximately the same velocity as the liquid within the centrifuge device 1. The pressure drop across the discharge openings should be less than 2000 Pa to ensure that an overpressure is maintained at the water outlet relative to the pressure at the oil outlet. This means that the diameter of the hole in this example must be in excess of 5 mm for the chosen diameter and liquid flow.

The invention claimed is:

1. An apparatus for separating a fluid flow, the fluid flow comprising lighter and heavier fractions to be separated from each other, the apparatus comprising at least one inlet and at least two outlets, the apparatus further comprising a rotary centrifuge device, the lighter fractions being carried through one of the outlets and the heavier fractions being carried through the other one of the outlets, wherein a spin-up assembly is arranged upstream of the centrifuge device, the spin-up assembly being configured in such a manner that the fluid flow entering the centrifuge device is imparted a rotational movement, the rotational velocity of the centrifuge device being adjustable to allow adjustment of the relative velocity difference between the rotating movement of the fluid flow and the rotational velocity of the centrifuge device and wherein the spin-up-assembly and/or centrifuge device is located in a replaceable bore that is replaceable with at least one other bore containing an open pipe without any constrictions or blocking elements, whereby the separator may be pigged.

2. The apparatus of claim 1, wherein the centrifuge device is provided with a number of holes through which the heavier fraction is admitted.

3. The apparatus of claim 1, wherein the spin-up assembly does not rotate and that the centrifuge device is made to rotate by means of a suitable drive.

4. The apparatus of claim 1, wherein the spin-up assembly is designed in such a manner that it effects the rotating movement of the centrifuge device.

5. The apparatus of claim 4, wherein the relative difference in rotational velocity between the spin-up assembly and the centrifuge device is adjustable.

6. The apparatus according to claim 1, wherein a spin-down assembly is positioned downstream of the centrifuge device.

7. The apparatus according to claim 1, wherein said spin-up assembly and the at least one other bore containing an open pipe without any constrictions or blocking elements to allow passage of a pig therethrough are installed in a revolver magazine comprising a number of bores.

8. The apparatus according to claim 1, wherein at least the spin up assembly and the at least one other bore containing an open pipe without any constrictions or blocking elements to allow the passage of a pig therethrough installed in a hydraulic or other type of piston that allows the separation apparatus to be replaced by an open bore.

9. The apparatus of claim 1 wherein the spin-up assembly is located in the replaceable bore, and the centrifuge device is fixed and is of a substantially cylindrical type whereby the separator may be pigged.

10. The apparatus of claim 9, wherein the centrifuge device is provided with a number of holes through which the heavier fraction is admitted.

11. The apparatus of claim 9, wherein the spin-up assembly does not rotate and that the centrifuge device is made to rotate by means of a suitable drive.

12. The apparatus of claim 9, wherein the spin-up assembly is designed in such a manner that it effects the rotating movement of the centrifuge device.

13. The apparatus of claim 12, wherein the relative difference in rotational velocity between the spin-up assembly and the centrifuge device is adjustable.

14. The apparatus according to claim 9, wherein a spin-down assembly is positioned downstream of the centrifuge device.

15. The apparatus according to claim 9, wherein said spin-up assembly and the at least one other bore containing an open pipe without any constrictions or blocking elements to allow passage of a pig therethrough are installed in a revolver magazine comprising a number of bores.

16. The apparatus according to claim 9, wherein at least the spin up assembly and the at least one other bore containing an open pipe without any constrictions or blocking elements to allow the passage of a pig therethrough are installed in a hydraulic or other type of piston that allows the separation apparatus to be replaced by an open bore.

17. An apparatus for separating a fluid flow, the fluid flow comprising lighter and heavier fractions to be separated from each other, the apparatus comprising at least one inlet and at least two outlets, the apparatus further comprising a rotary centrifuge device, the lighter fractions being carried through one of the outlets and the heavier fractions being carried through the other one of the outlets, wherein a spin-up assembly is arranged upstream of the centrifuge device, the spin-up assembly being configured in such a manner that the fluid flow entering the centrifuge device is imparted a rotational movement, the rotational velocity of the centrifuge device being adjustable to allow adjustment of the relative velocity difference between the rotating movement of the fluid flow and the rotational velocity of the centrifuge device is optimal in terms of separation and wherein said one or more separation apparatuses are installed in a revolver magazine comprising a number of bores, one of the bores being adapted to allow the passage of a pig therethrough.

18. A separation apparatus for separating a fluid flow, the fluid flow comprising lighter and heavier fractions to be separated from each other, the apparatus comprising at least one inlet and at least two outlets, the apparatus further comprising a rotary centrifuge device, the lighter fractions being carried through one of the outlets and the heavier fractions being carried through the other one of the outlets wherein a spin-up assembly is arranged upstream of the centrifuge device, the spin-up assembly being configured in such a manner that the fluid flow entering the centrifuge device is imparted a rotational movement, the rotational velocity of the centrifuge device being adjustable to allow adjustment of the relative velocity difference between the rotating movement of the fluid flow and the rotational velocity of the centrifuge device is optimal in terms of separation and wherein one or more of said separation apparatuses are installed in a hydraulic or other type of piston that allows the separation apparatus to be replaced by an open bore, so that a pig may pass therethrough.

19. An apparatus for separating a fluid flow, the fluid flow comprising lighter and heavier fractions to be separated from each other, the apparatus comprising at least one inlet and at least two outlets, the apparatus further comprising a rotary centrifuge device, the lighter fractions being carried through one of the outlets and the heavier fractions being carried through the other one of the outlets wherein a spin-up assembly is arranged upstream of the centrifuge device, the spin-up assembly being configured in such a manner that the fluid flow entering the centrifuge device is imparted a rotational movement, the rotational velocity of the centrifuge device being adjustable to allow adjustment of the relative velocity difference between the rotating movement of the fluid flow and the rotational velocity of the centrifuge device is optimal in terms of separation and wherein the spin-up assembly is designed in such a manner that it effects the rotating movement of the centrifuge device.

20. An apparatus for separating a fluid flow, the fluid flow comprising lighter and heavier fractions to be separated from each other, the apparatus comprising at least one inlet and at least two outlets, the apparatus further comprising a rotary centrifuge device, the lighter fractions being carried through one of the outlets and the heavier fractions being carried through the other one of the outlets wherein a spin-up assembly is arranged upstream of the centrifuge device, the spin-up assembly being configured in such a manner that the fluid flow entering the centrifuge device is imparted a rotational movement, the rotational velocity of the centrifuge device being adjustable to allow adjustment of the relative velocity difference between the rotating movement of the fluid flow and the rotational velocity of the centrifuge device is optimal in terms of separation and wherein the relative difference in rotational velocity between the spin-up assembly and the centrifuge device is adjustable.

* * * * *